United States Patent
Jung et al.

(10) Patent No.: US 8,203,685 B2
(45) Date of Patent: Jun. 19, 2012

(54) LIQUID CRYSTAL DISPLAY PANEL HAVING SEAL PATTERN FOR MINIMIZING LIQUID CRYSTAL CONTAMINATION AND METHOD OF MANUFACTURING THE SAME

(75) Inventors: Sung Su Jung, Daegu (KR); Yong Keun Kwak, Ganwon-Do (KR)

(73) Assignee: LG Display Co., Ltd., Seoul (KR)

( * ) Notice: Subject to any disclaimer, the term of this patent is extended or adjusted under 35 U.S.C. 154(b) by 1080 days.

(21) Appl. No.: 12/149,594

(22) Filed: May 5, 2008

(65) Prior Publication Data

US 2008/0273158 A1    Nov. 6, 2008

Related U.S. Application Data

(63) Continuation-in-part of application No. 10/824,436, filed on Apr. 15, 2004, now Pat. No. 7,408,614.

(30) Foreign Application Priority Data

Dec. 10, 2003 (KR) ........................ 10-2003-0089855

(51) Int. Cl.
*G02F 1/1339* (2006.01)
(52) U.S. Cl. ...................................... 349/153
(58) Field of Classification Search .................... 349/153
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,640,583 A | 2/1987 | Hoshikawa et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |

(Continued)

FOREIGN PATENT DOCUMENTS

CN            1447164         10/2003

(Continued)

*Primary Examiner* — Timothy L Rude
(74) *Attorney, Agent, or Firm* — McKenna Long & Aldridge, LLP (57) ABSTRACT

A liquid crystal display panel and the method of manufacturing the same are disclosed. Because an overlap portion of the seal pattern that encompasses in a closed form the outer edge of the image display part is minimized, excessive distribution of sealant at the overlap portion may be prevented. The liquid crystal display panel includes a first and a second substrates having at least one image display part; a main pattern on one of the first and second substrates and encompassing the outer edge of the image display part; a start pattern connected to the main pattern and formed from a point spaced apart from the image display part to a point adjacent to an outer edge of the image display part; an end pattern connected to the main pattern and formed from the point adjacent to the outer edge of the image display part to a point spaced apart from the image display part, wherein the start pattern and end pattern extend in a direction substantially parallel to a facing side of the main pattern; and liquid crystal dispensed in the image display part.

26 Claims, 8 Drawing Sheets

U.S. PATENT DOCUMENTS

| | | | |
|---|---|---|---|
| 5,511,591 | A | 4/1996 | Abe |
| 5,539,545 | A | 7/1996 | Shimizu et al. |
| 5,548,429 | A | 8/1996 | Tsujita |
| 5,642,214 | A | 6/1997 | Ishii et al. |
| 5,680,189 | A | 10/1997 | Shimizu et al. |
| 5,742,370 | A | 4/1998 | Kim et al. |
| 5,757,451 | A | 5/1998 | Miyazaki et al. |
| 5,852,484 | A | 12/1998 | Inoue et al. |
| 5,854,664 | A | 12/1998 | Inoue et al. |
| 5,861,932 | A | 1/1999 | Inata et al. |
| 5,875,922 | A | 3/1999 | Chastine et al. |
| 5,893,625 | A | 4/1999 | Tamatani et al. |
| 5,952,676 | A | 9/1999 | Sato et al. |
| 5,956,112 | A | 9/1999 | Fujimori et al. |
| 6,001,203 | A | 12/1999 | Yamada et al. |
| 6,011,609 | A | 1/2000 | Kato et al. |
| 6,016,178 | A | 1/2000 | Kataoka et al. |
| 6,016,181 | A | 1/2000 | Shimada |
| 6,055,035 | A | 4/2000 | von Gutfeld et al. |
| 6,163,357 | A | 12/2000 | Nakamura |
| 6,219,126 | B1 | 4/2001 | von Gutfeld |
| 6,226,067 | B1 | 5/2001 | Nishiguchi et al. |
| 6,236,445 | B1 | 5/2001 | Foschaar et al. |
| 6,304,306 | B1 | 10/2001 | Shiomi et al. |
| 6,304,311 | B1 | 10/2001 | Egami et al. |
| 6,337,730 | B1 | 1/2002 | Ozaki et al. |
| 6,414,733 | B1 | 7/2002 | Ishikawa et al. |
| 6,707,250 | B2 | 3/2004 | Okano et al. |
| 7,408,614 | B2 * | 8/2008 | Jung et al. ............ 349/190 |
| 2003/0016936 | A1 | 1/2003 | Rosenberger et al. |
| 2003/0025867 | A1 | 2/2003 | Yoshizoe |
| 2003/0081155 | A1 | 5/2003 | Moon et al. |
| 2003/0179340 | A1 | 9/2003 | Park et al. |
| 2003/0223030 | A1 | 12/2003 | Byun et al. |

FOREIGN PATENT DOCUMENTS

| | | |
|---|---|---|
| EP | 1 003 066 A1 | 5/2000 |
| JP | 51-65656 | 6/1976 |
| JP | 51-065656 | 6/1976 |
| JP | 57-038414 | 3/1982 |
| JP | 57-038414 A1 | 3/1982 |
| JP | 57-088428 | 6/1982 |
| JP | 57-088428 A1 | 6/1982 |
| JP | 58-027126 | 2/1983 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-164723 A1 | 8/1985 |
| JP | 60-217343 | 10/1985 |
| JP | 60-217343 A1 | 10/1985 |
| JP | 61-007822 | 1/1986 |
| JP | 61-007822 A1 | 1/1986 |
| JP | 61-055625 | 3/1986 |
| JP | 61-055625 A1 | 3/1986 |
| JP | 62-054225 | 3/1987 |
| JP | 62-054228 | 3/1987 |
| JP | 62-054229 | 3/1987 |
| JP | S62-054229 | 3/1987 |
| JP | 60-089025 | 4/1987 |
| JP | 62-089025 A1 | 4/1987 |
| JP | 62-090622 | 4/1987 |
| JP | 62-090622 A1 | 4/1987 |
| JP | 62-205319 | 9/1987 |
| JP | 62-205319 A1 | 9/1987 |
| JP | 63-109413 | 5/1988 |
| JP | 63-109413 A1 | 5/1988 |
| JP | 63-110425 | 5/1988 |
| JP | 63-110425 A1 | 5/1988 |
| JP | 63-128315 | 5/1988 |
| JP | 63-128315 A1 | 5/1988 |
| JP | 63-311233 | 12/1988 |
| JP | 63-311233 A1 | 12/1988 |
| JP | 03-009549 | 1/1991 |
| JP | 05-036425 | 2/1993 |
| JP | 05-036426 | 2/1993 |
| JP | 05-107533 | 4/1993 |
| JP | 05-127179 | 5/1993 |
| JP | 05-127179 A1 | 5/1993 |
| JP | 05-154923 | 6/1993 |
| JP | 05-265011 | 10/1993 |
| JP | 05-265011 A1 | 10/1993 |
| JP | 5-273562 | 10/1993 |
| JP | 05-281557 | 10/1993 |
| JP | 05-281557 A1 | 10/1993 |
| JP | 05-281562 | 10/1993 |
| JP | 05-281562 A1 | 10/1993 |
| JP | 06-018829 | 1/1994 |
| JP | 06-051256 | 2/1994 |
| JP | 06-051256 A1 | 2/1994 |
| JP | 06-064229 | 3/1994 |
| JP | 06-148657 | 5/1994 |
| JP | 06-148657 A1 | 5/1994 |
| JP | 06-160871 | 6/1994 |
| JP | 06-194637 | 7/1994 |
| JP | 06-235925 | 8/1994 |
| JP | 06-265915 | 9/1994 |
| JP | 06-265915 A1 | 9/1994 |
| JP | 06-313870 | 11/1994 |
| JP | 07-084268 | 3/1995 |
| JP | 07-128674 | 5/1995 |
| JP | 07-128674 A1 | 5/1995 |
| JP | 07-181507 | 7/1995 |
| JP | 07-181507 A1 | 7/1995 |
| JP | 07-275770 | 10/1995 |
| JP | 07-275771 | 10/1995 |
| JP | 08-076133 | 3/1996 |
| JP | 08-095066 | 4/1996 |
| JP | 08-095066 A1 | 4/1996 |
| JP | 08-101395 | 4/1996 |
| JP | 08-106101 | 4/1996 |
| JP | 08-106101 A1 | 4/1996 |
| JP | 08-110504 | 4/1996 |
| JP | 08-136937 | 5/1996 |
| JP | 08-171094 | 7/1996 |
| JP | 08-171094 A1 | 7/1996 |
| JP | 08-173874 | 7/1996 |
| JP | 08-190099 | 7/1996 |
| JP | 08-190099 A1 | 7/1996 |
| JP | 08-240807 | 9/1996 |
| JP | 08-240807 A1 | 9/1996 |
| JP | 09-001026 | 1/1997 |
| JP | 09-005762 | 1/1997 |
| JP | 09-005762 A1 | 1/1997 |
| JP | 09-026578 | 1/1997 |
| JP | 09-026578 A1 | 1/1997 |
| JP | 09-311340 | 2/1997 |
| JP | 09-61829 | 3/1997 |
| JP | 09-061829 | 3/1997 |
| JP | 09-073075 | 3/1997 |
| JP | 09-073075 A1 | 3/1997 |
| JP | 09-073096 | 3/1997 |
| JP | 09-073096 A1 | 3/1997 |
| JP | 09-094500 | 4/1997 |
| JP | 09-127528 | 5/1997 |
| JP | 09-127528 A1 | 5/1997 |
| JP | 09-230357 | 9/1997 |
| JP | 09-230357 A1 | 9/1997 |
| JP | 09-281511 | 10/1997 |
| JP | 09-281511 A1 | 10/1997 |
| JP | 09-311340 A1 | 12/1997 |
| JP | 10-123537 | 5/1998 |
| JP | 10-123537 A1 | 5/1998 |
| JP | 10-123538 | 5/1998 |
| JP | 10-123538 A1 | 5/1998 |
| JP | 10-142616 | 5/1998 |
| JP | 10-142616 A1 | 5/1998 |
| JP | 10-174924 | 6/1998 |
| JP | 10-177178 | 6/1998 |
| JP | 10-221700 | 8/1998 |
| JP | 10-221700 A1 | 8/1998 |
| JP | 10-282512 | 10/1998 |
| JP | 10-282512 A1 | 10/1998 |
| JP | 10-333157 | 12/1998 |
| JP | 10-333159 | 12/1998 |

| | | | | | | |
|---|---|---|---|---|---|---|
| JP | 11-014953 | 1/1999 | | JP | 2001-330837 | 11/2001 |
| JP | 11-014953 A1 | 1/1999 | | JP | 2001-330840 | 11/2001 |
| JP | 11-038424 | 2/1999 | | JP | 2001-330840 A1 | 11/2001 |
| JP | 11-038424 A1 | 2/1999 | | JP | 2001-356353 | 12/2001 |
| JP | 11-064811 | 3/1999 | | JP | 2001-356354 | 12/2001 |
| JP | 11-064811 A1 | 3/1999 | | JP | 2001-356354 A1 | 12/2001 |
| JP | 11-109388 | 4/1999 | | JP | 2002-014360 | 1/2002 |
| JP | 11-109388 A1 | 4/1999 | | JP | 2002-014360 A1 | 1/2002 |
| JP | 11-133438 | 5/1999 | | JP | 2002-023176 | 1/2002 |
| JP | 11-142864 | 5/1999 | | JP | 2002-023176 A1 | 1/2002 |
| JP | 11-174477 | 7/1999 | | JP | 2002-049045 | 2/2002 |
| JP | 11-174477 A1 | 7/1999 | | JP | 2002-049045 A1 | 2/2002 |
| JP | 11-212045 | 8/1999 | | JP | 2002-079160 | 3/2002 |
| JP | 11-212045 A1 | 8/1999 | | JP | 2002-080321 | 3/2002 |
| JP | 11-248930 | 9/1999 | | JP | 2002-082340 | 3/2002 |
| JP | 11-262712 | 9/1999 | | JP | 2002-082340 A1 | 3/2002 |
| JP | 11-264991 | 9/1999 | | JP | 2002-090759 | 3/2002 |
| JP | 11-326922 | 11/1999 | | JP | 2002-090759 A1 | 3/2002 |
| JP | 11-344714 | 12/1999 | | JP | 2002-090760 | 3/2002 |
| JP | 11-344714 A1 | 12/1999 | | JP | 2002-090760 A1 | 3/2002 |
| JP | 2000-002879 | 1/2000 | | JP | 2002-098979 | 4/2002 |
| JP | 2000-029035 | 1/2000 | | JP | 2002-107740 | 4/2002 |
| JP | 2000-056311 | 2/2000 | | JP | 2002-107740 A1 | 4/2002 |
| JP | 2000-066165 | 3/2000 | | JP | 2002-122870 | 4/2002 |
| JP | 2000-066218 | 3/2000 | | JP | 2002-122872 | 4/2002 |
| JP | 2000-093866 | 4/2000 | | JP | 2002-122872 A1 | 4/2002 |
| JP | 2000-137235 | 5/2000 | | JP | 2002-122873 | 4/2002 |
| JP | 2000-147528 | 5/2000 | | JP | 2002-122873 A1 | 4/2002 |
| JP | 2000-193988 | 7/2000 | | JP | 2002-131762 | 5/2002 |
| JP | 2000-241824 | 9/2000 | | JP | 2002-139734 | 5/2002 |
| JP | 2000-284295 | 10/2000 | | JP | 2002-156518 | 5/2002 |
| JP | 2000-292799 | 10/2000 | | JP | 2002-169166 | 6/2002 |
| JP | 2000-310759 | 11/2000 | | JP | 2002-169167 | 6/2002 |
| JP | 2000-310784 | 11/2000 | | JP | 2002-182222 | 6/2002 |
| JP | 2000-338501 | 12/2000 | | JP | 2002-202512 | 7/2002 |
| JP | 2001-005401 | 1/2001 | | JP | 2002-202512 A1 | 7/2002 |
| JP | 2001-005405 | 1/2001 | | JP | 2002-202514 | 7/2002 |
| JP | 2001-013506 | 1/2001 | | JP | 2002-202514 A1 | 7/2002 |
| JP | 2001-033793 | 2/2001 | | JP | 2002-214626 | 7/2002 |
| JP | 2001-042341 | 2/2001 | | JP | 2002-214626 A1 | 7/2002 |
| JP | 2001-051284 | 2/2001 | | JP | 2002-229042 | 8/2002 |
| JP | 2001-066615 | 3/2001 | | JP | 2002-236276 | 8/2002 |
| JP | 2001-091727 | 4/2001 | | JP | 2002-258299 | 8/2002 |
| JP | 2001-117105 | 4/2001 | | JP | 2002-236292 | 9/2002 |
| JP | 2001-117109 | 4/2001 | | JP | 2002-277865 | 9/2002 |
| JP | 2001-133745 | 5/2001 | | JP | 2002-277866 | 9/2002 |
| JP | 2001-133794 | 5/2001 | | JP | 2002-277881 | 9/2002 |
| JP | 2001-133799 | 5/2001 | | JP | 2002-287156 | 10/2002 |
| JP | 2001-142074 | 5/2001 | | JP | 2002-296605 | 10/2002 |
| JP | 2001-147437 | 5/2001 | | JP | 2002-311438 | 10/2002 |
| JP | 2001-154211 | 6/2001 | | JP | 2002-311440 | 10/2002 |
| JP | 2001-166272 | 6/2001 | | JP | 2002-311442 | 10/2002 |
| JP | 2001-166310 | 6/2001 | | JP | 2002-323687 | 11/2002 |
| JP | 2001-183683 | 7/2001 | | JP | 2002-323694 | 11/2002 |
| JP | 2001-201750 | 7/2001 | | JP | 2002-333628 | 11/2002 |
| JP | 2001-209052 | 8/2001 | | JP | 2002-333635 | 11/2002 |
| JP | 2001-209056 | 8/2001 | | JP | 2002-333843 | 11/2002 |
| JP | 2001-209057 | 8/2001 | | JP | 2002-341329 | 11/2002 |
| JP | 2001-209058 | 8/2001 | | JP | 2002-341355 | 11/2002 |
| JP | 2001-209060 | 8/2001 | | JP | 2002-341356 | 11/2002 |
| JP | 2001-215459 | 8/2001 | | JP | 2002-341357 | 11/2002 |
| JP | 2001-222017 | 8/2001 | | JP | 2002-341358 | 11/2002 |
| JP | 2001-235758 | 8/2001 | | JP | 2002-341359 | 11/2002 |
| JP | 2001-215459 | 9/2001 | | JP | 2002-341362 | 11/2002 |
| JP | 2001-255542 | 9/2001 | | JP | 2003-43499 | 2/2003 |
| JP | 2001-264782 | 9/2001 | | JP | 2003-344863 | 3/2003 |
| JP | 2001-201750 | 10/2001 | | KR | 2000-0035302 | 6/2000 |
| JP | 2001-272640 | 10/2001 | | KR | 2000-035302 A1 | 6/2000 |
| JP | 2001-281675 | 10/2001 | | KR | 10-2003-0069458 | 8/2003 |
| JP | 2001-281678 | 10/2001 | | | | |
| JP | 2001-282126 | 10/2001 | | | | |
| JP | 2001-305563 | 10/2001 | | | | |

* cited by examiner

LIQUID CRYSTAL DISPLAY PANEL HAVING SEAL PATTERN FOR MINIMIZING LIQUID CRYSTAL CONTAMINATION AND METHOD OF MANUFACTURING THE SAME

This application is a Continuation-in-Part of application Ser. No. 10/824,436 filed Apr. 15, 2004, now U.S. Pat. No. 7,408,614 which claims the benefit of Korean Patent Application No. 10/2003-89855 filed Dec. 10, 2003, which are hereby incorporated by reference for all purposes as if fully set forth herein.

BACKGROUND OF THE INVENTION

1. Field of the Invention

The present invention relates to a liquid crystal display panel and, more particularly, to a liquid crystal display panel capable of minimizing an overlap portion of a seal pattern encompassing an outer edge of an image display part in a closed form.

2. Discussion of the Related Art

In general, a liquid crystal display is a display device where data signals that correspond to picture information are individually supplied to liquid crystal cells arranged in a matrix form. The light transmittance of each of the liquid crystal cells is controlled to display a desired picture.

The liquid crystal display device includes a liquid crystal display panel having pixels arranged in a matrix form and a gate driving unit and a data driving unit for driving the pixels.

The liquid crystal display panel also has a color filter substrate and a thin film transistor array substrate attached to each other, but maintaining a uniform cell gap there between, and a liquid crystal layer between the color filter substrate and the thin film transistor array substrate.

The liquid crystal display panel is formed by the color filter substrate and the thin film transistor array substrate being attached. A common electrode and a pixel electrode are formed to apply an electric field to the liquid crystal layer and may both be formed on the thin film transistor array substrate or the common electrode may be formed on the color filter substrate and the pixel electrode may be formed on the thin film transistor array substrate, depending on the type of LCD.

Namely, in a state that a voltage is applied to the common electrode, a voltage applied to the pixel electrode is controlled, thereby individually adjusting light transmittance of unit pixels. In order to control the voltage applied to the pixel electrode by unit pixels, a thin film transistor is used as a switching unit is formed at each unit pixel.

Alignment layers are formed at both facing surfaces of the thin film transistor array substrate and the color filter substrate. The alignment layers are rubbed or photoaligned to align the liquid crystal molecules of the liquid crystal layer in a certain direction.

Figure 1:
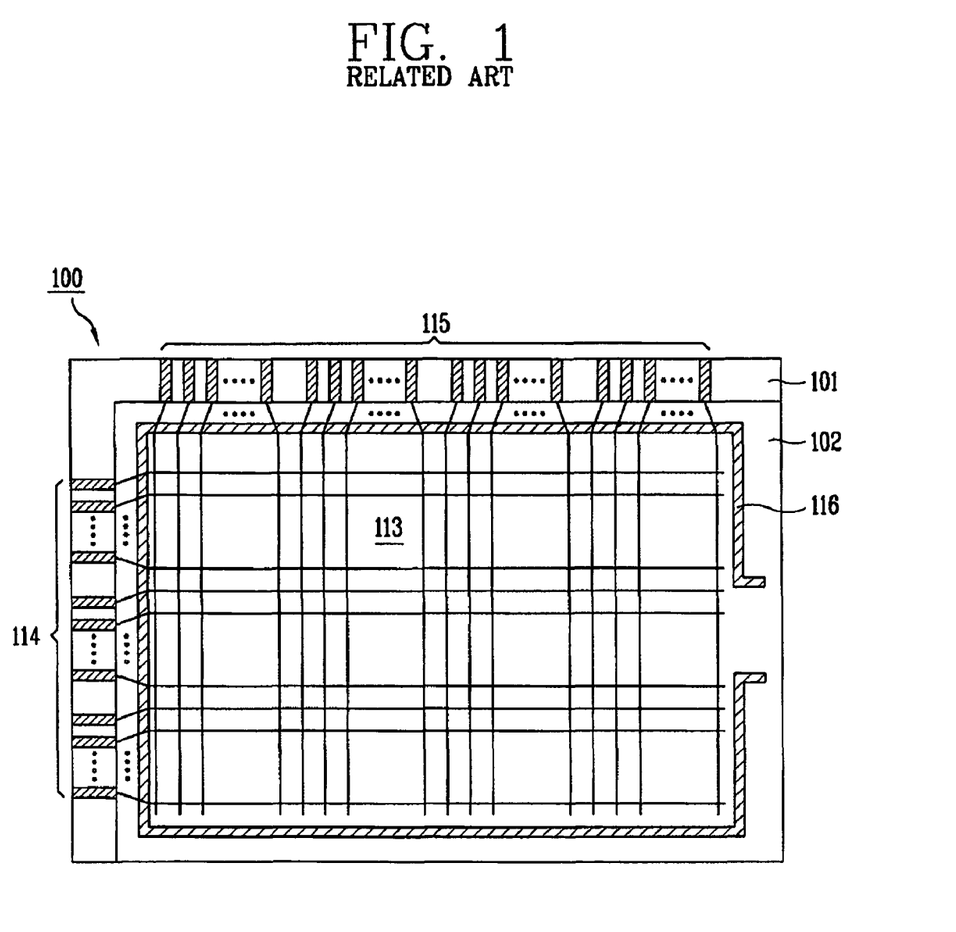
FIG. 1 is a plan view of the unit liquid crystal display panel formed by a thin film transistor array substrate and a color filter substrate according to the related art.

FIG. 1 is a plan view of the unit liquid crystal display panel formed by a thin film transistor array substrate and a color filter substrate according to the related art.

As illustrated in FIG. 1, the liquid crystal display panel 100 includes an image display part 113 in which the liquid crystal cells are arranged in a matrix form, a gate pad part 114 connected to the gate lines of the image display part 113, and a data pad part 115 connected to the data lines. The gate pad part 114 and the data pad part 115 are formed along an edge region of the thin film transistor array substrate 101 that does not overlap with the color filter substrate 102, e.g., the portion of the thin film transistor array substrate 101 that extends beyond the edge of the color filter substrate 102. The gate pad part 114 supplies a scan signal from a gate driver integrated circuit (not shown) to the gate lines of the image display part 113, and the data pad part 115 supplies image information from a data driver integrated circuit (not shown) to the data lines of the image display part 113.

Data lines to which image information is applied and gate lines to which a scan signal is applied are provided on the thin film transistor array substrate 101. The data lines and the gate lines cross each other. Additionally, a thin film transistor for switching the liquid crystal cells is provided at each crossing of the data lines and the gate lines. A pixel electrode for driving the liquid crystal cells connected to the thin film transistor is provided on the thin film transistor array substrate 101, and a passivation film protecting the pixel electrode and the thin film transistor is formed on the entire surface of the thin film transistor array substrate 101.

Color filters (not shown) in the cell regions are separated by a black matrix (not shown). A common transparent electrode is provided on the color filter substrate 102. A cell gap is formed by a spacer between the thin film transistor array substrate 101 and the color filter substrate 102, which are attached to each other by a seal pattern 116 formed along an outer edge of the image display part 113.

In fabricating the liquid crystal display panel, a method for simultaneously forming a plurality of liquid crystal display panels on a large-scale mother substrate is typically used. Thus, this method requires a process for separating the liquid crystal display panels from the large-scale mother substrate by cutting and processing the large-scale mother substrate having the plurality of liquid crystal display panels formed thereon.

After the liquid crystal display panel is separated from the large-scale mother substrate, liquid crystal is injected through a liquid crystal injection opening to form a liquid crystal layer in the cell gap that separates the thin film transistor array substrate 101 and the color filter substrate 102. Then, the liquid crystal injection opening is sealed.

To fabricate a liquid crystal display panel, the following processes are generally required. First, the thin film transistor array substrate 101 and the color filter substrate 102 are separately fabricated on the first and second mother substrates. The first and second mother substrates are attached in such a manner that a uniform cell gap is maintained therebetween. The attached first and second mother substrates are cut into the plurality of unit liquid crystal display panels. Then, the liquid crystal is injected to the cell gap between the thin film transistor array substrate 101 and the color filter substrate 102.

A process of forming the seal pattern 116 along an outer edge of the image display part 113 is required to attach the thin film transistor array substrate 101 and the color filter substrate 102. The related art method of forming the seal pattern 116 will now be described.

Figure 2A:
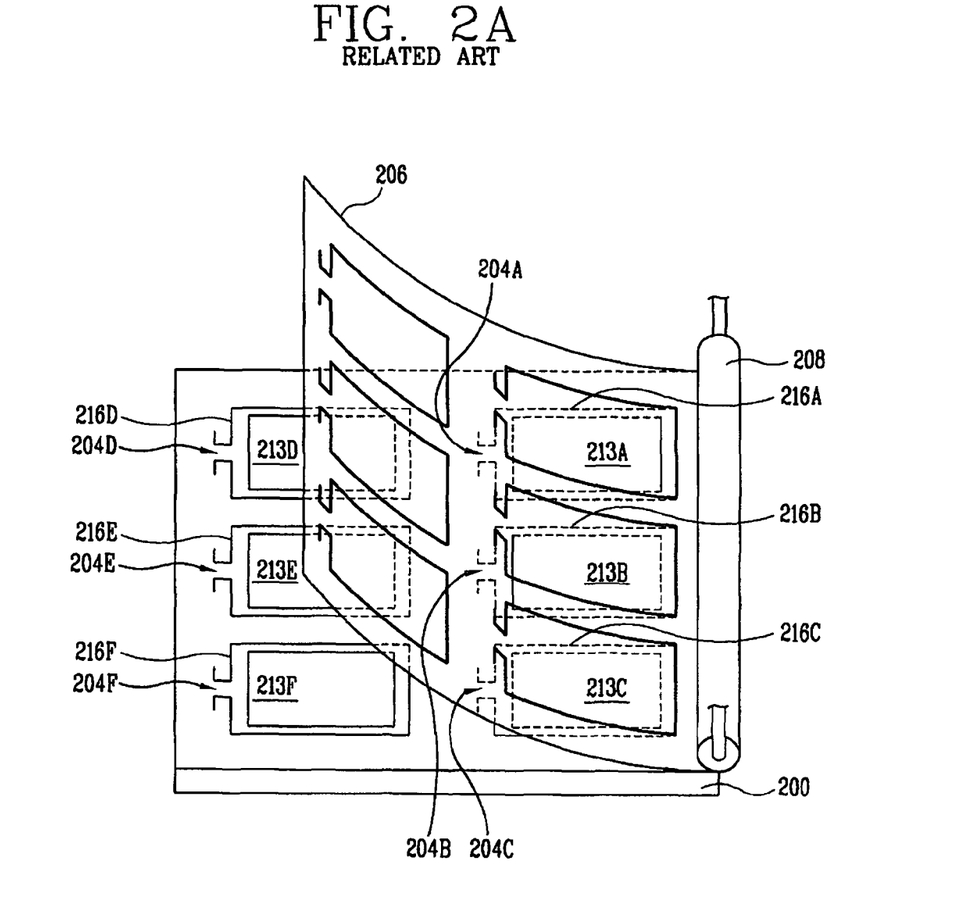
FIGS. 2A and 2B illustrate a screen printing method for forming seal patterns.
Figure 2B:
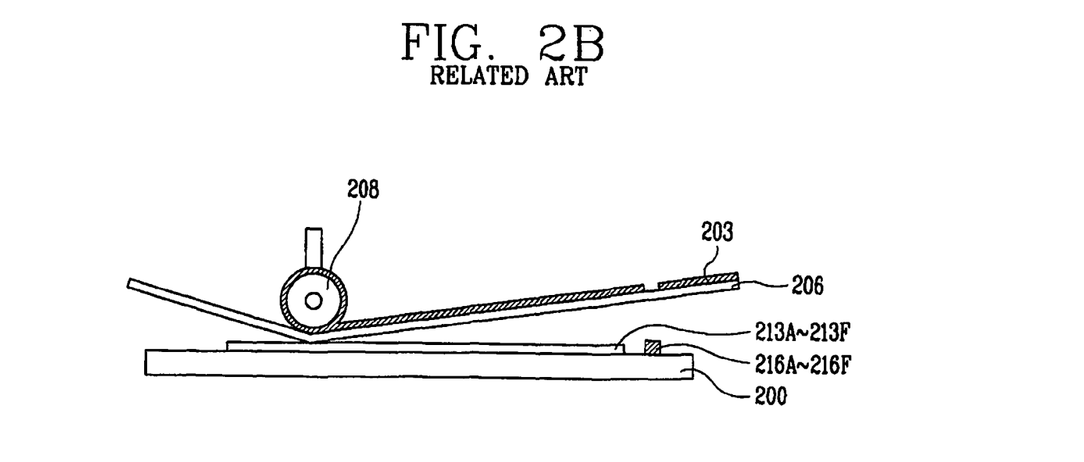

FIGS. 2A and 2B illustrate a screen printing method for forming seal patterns.

As shown in FIGS. 2A and 2B, there is provided a screen mask 206 patterned so that a plurality of seal pattern forming regions for forming a plurality of seal patterns 216A-216F are selectively exposed. A rubber squeegee 208 for selectively supplying a sealant 203 to the substrate 200 through the screen mask 206 is used to simultaneously form the plurality of seal patterns 216A-216F. Thus, the plurality of seal patterns 216A-216F are formed along each outer edge of image display part 213A-213F of the substrate 200, and liquid crystal injection openings 204A-204F are formed at one side. The liquid crystal injection openings 204A-204F are for injecting liquid crystal into a gap between the thin film transistor array substrate and the color filter substrate. The plurality of seal patterns 216A-216F prevent leakage of the liquid crystal.

The screen printing method includes applying the sealant 203 on the screen mask 206 having seal pattern forming regions patterned thereon, forming the plurality of seal patterns 216A-216F on the substrate 200 through printing with the rubber squeegee 208, drying the plurality of seal patterns 216A-216F by evaporating a solvent contained in the plurality of seal patterns 216A-216F, and leveling it the plurality of seal patterns 216A-216F.

The screen printing method is widely used because it has the advantage of processing ease. However, it has the disadvantage of sealant waste. More particularly, sealant 203 is wasted because sealant 203 is applied to the entire surface of the screen mask 206 and then the plurality of seal patterns 216A-216F are simultaneously printed with the rubber squeegee 208 such that the excess sealant 203, which is not printed, is thrown away.

In addition, the screen printing method has another disadvantage in that a rubbed alignment layer (not shown) formed on the substrate 200 is degraded as a result of the screen mask 206 being brought into contact with the substrate 200. The degradation of the rubbed alignment layer degrades picture quality of the liquid crystal display device.

Therefore, to overcome the shortcomings of the screen printing method, a dispensing method has been proposed.

Figure 3:
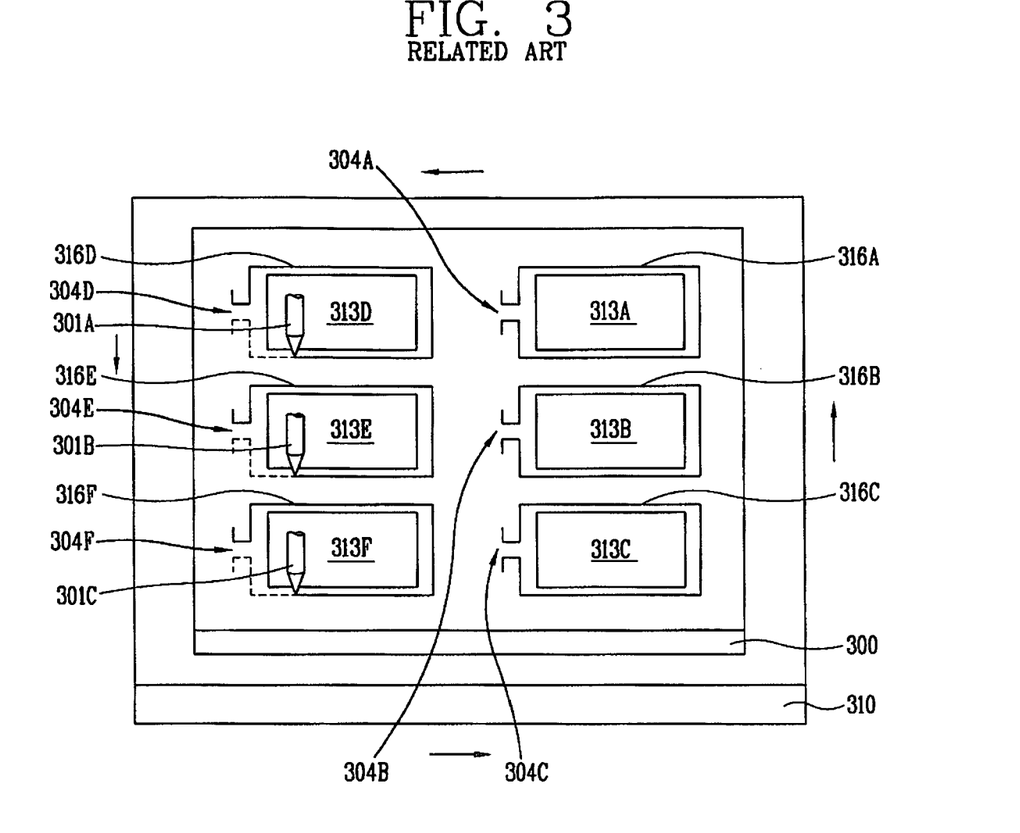
FIG. 3 illustrates a dispensing method for forming seal patterns.

FIG. 3 illustrates a dispensing method for forming seal patterns.

As illustrated in FIG. 3, while a table 310 with the substrate 300 loaded thereon is being moved in forward/backward and left/right directions, a plurality of seal patterns 316A-316F are formed along each outer edge of a plurality of image display parts 313A-313F formed on a substrate 300 by applying a certain pressure to the plurality of syringes 301A-301C filled with sealant. And one side of each seal patterns 316A-316F is opened to form liquid crystal injection openings 304A-304F.

In this dispensing method, because the sealant is selectively supplied to the region where the plurality of seal patterns 316A-316F are to be formed, sealant consumption may be reduced. In addition, since the plurality of syringes 301A-301C do not contact the alignment layer (not shown) of the plurality of image display parts 313A-313F of the substrate 300, the rubbed alignment layer may not be damaged, and thus the picture quality of the liquid crystal display device is not degraded.

One respective side of each of the plurality of seal patterns 216A-216F and 316A-316F formed by the screen printing method or the dispensing method are opened to function as liquid crystal injection openings 204A-204F and 304A-304F. The plurality of seal patterns 216A-216F and 316A-316F may be varied in their forms according to methods for forming a liquid crystal layer on the liquid crystal display panel, that is, for example, according to a vacuum injection method and a dropping or dispensing method.

First, the vacuum injection method is performed using a liquid crystal injection opening of a unit liquid crystal display panel that has been separated from a large-scale mother substrate, which is put in a container filled with a liquid crystal in a chamber in which a certain vacuum is set. Then, liquid crystal is injected into the liquid crystal display panel according to a pressure difference between interior and exterior of the liquid crystal display panel by varying the degree of vacuum in the chamber. After the liquid crystal is filled in the liquid crystal display panel, the liquid crystal injection opening is sealed to form the liquid crystal layer of the liquid crystal display panel.

Thus, when the liquid crystal layer is formed on the liquid crystal display panel through the vacuum injection method, as illustrated in FIGS. 2A, 2B and 3, the plurality of seal patterns 216A-216F and 316A-316F are opened at one side to form the liquid crystal injection openings 204A-204F and 304A-304F.

However, the vacuum injection method as described above has the following problems.

First, it takes a long time to fill the liquid crystal into the liquid crystal display panel. In general, the attached liquid crystal display panel with an area of several hundreds $cm^2$ has a gap of a few μms (micrometers). Thus, even with the vacuum injection method, which uses pressure difference, the injection of liquid crystal takes a long time. For instance, in the case of fabricating a liquid crystal display panel of about 15 inches, it takes 8 hours to fill the liquid crystal display panel with liquid crystal. Thus, because such a long time is taken during the fabrication of the liquid crystal display panel, the productivity is degraded. In addition, as the liquid crystal display panel increases in size, the time required for filling liquid crystal correspondingly increases, and thus liquid crystal filling defects further occur. Therefore, the vacuum injection method can hardly cope with the large-scale liquid crystal display panel.

Another problem with the vacuum injection method is that too much liquid crystal is consumed. In general, the actually injected quantity of liquid crystal in the vacuum injection method is very small compared to the quantity of liquid crystal in the container. When liquid crystal is exposed in the air or to a specific gas, it reacts with the gas and degrades. Thus, even if liquid crystal in a container is filled into a plurality of liquid crystal display panels. A large quantity of liquid crystal remaining after the filling has to be discarded, which increases the overall unit price of the liquid crystal display and thus decreases price competitiveness.

In order to overcome such problems of the vacuum injection method, a dropping method is proposed.

In the dropping or dispensing method, liquid crystal is dropped or dispensed on a plurality of thin film transistor array substrates fabricated from a first large-scale mother substrate or on a plurality of color filter substrates fabricated from a second large-scale mother substrate. The first and second mother substrates are then attached to each other so that liquid crystal is uniformly distributed over the entire image display regions by the attaching pressure, thereby forming a liquid crystal layer.

In the dropping method, liquid crystal may be dropped within a short time compared to the vacuum injection method. Even though the liquid crystal display panel is large in size, the liquid crystal layer may be quickly formed.

In addition, because only the amount of liquid crystal that is required is dropped, the high unit price of the liquid crystal display panel formed by the vacuum injection method caused by the expensive liquid crystal being discarded is prevented such that price competitiveness is improved.

Figure 4:
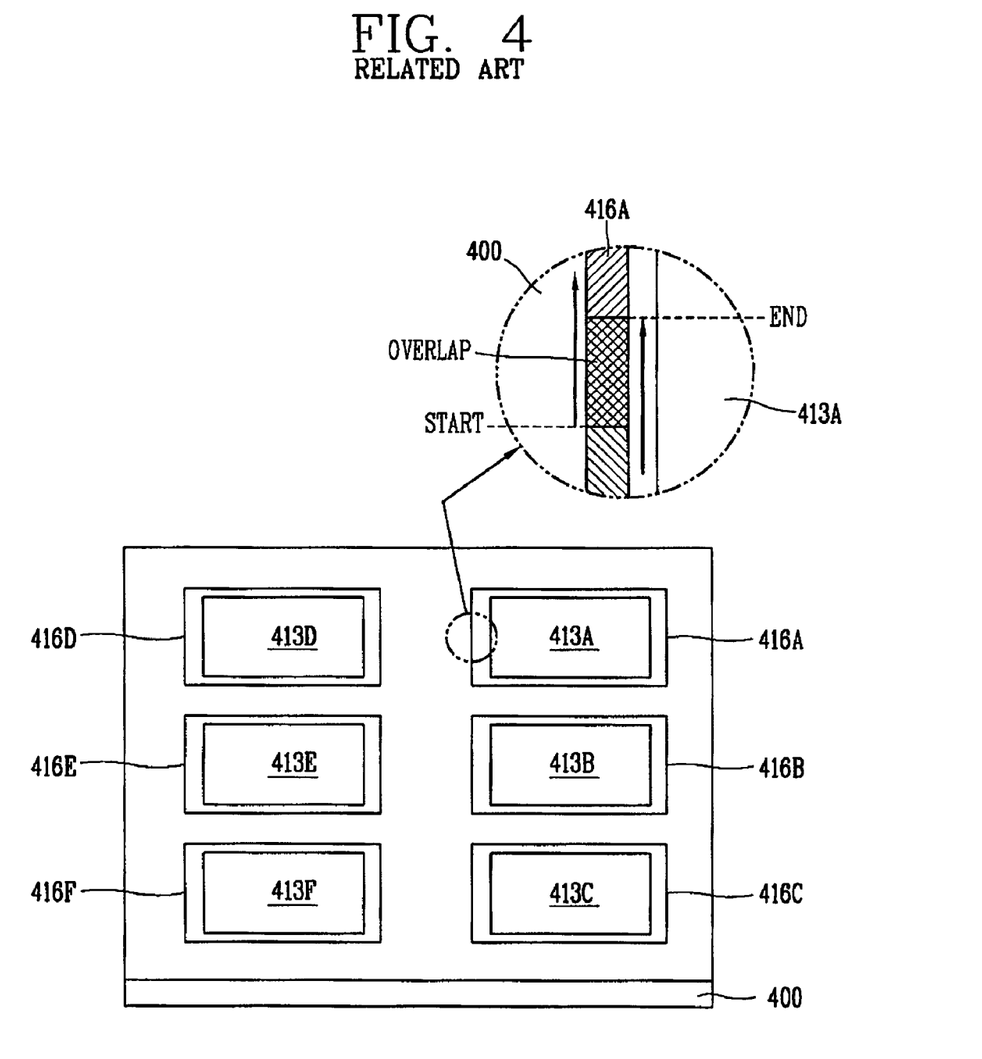
FIG. 4 illustrates seal patterns formed in forming a liquid crystal layer on a liquid crystal display panel through a dropping method.

When the liquid crystal layer is formed on the liquid crystal display panel through the dropping method, the plurality of seal patterns 416A-416F encompassing each outer edge of the plurality of image display parts 413A-413F formed on the substrate 400 have the closed patterns with start points and end points met each other, as illustrated in FIG. 4, thereby preventing leakage of liquid crystal outwardly. In this case, in order to ensure that the start points and the end points of the plurality of seal patterns 416A-416F meet each other, the start points and the end points overlap with each other at some portions.

Accordingly, in the case that the plurality of seal patterns 416A-416F are formed by the dispensing method such that their start points and end points overlap with each other at some portions, sealant is excessively distributed at the overlap portion compared to other portions.

The sealant excessively distributed at the overlap portion where the start points and the end points of the plurality of seal patterns 416A-416F meet each other may spread internally and externally of the plurality of image display parts 413A-413F because of an attaching pressure in a follow-up process of attaching the substrates 400 of the liquid crystal display panel.

Sealant that spreads into the plurality of image display parts 413A-413F contaminates liquid crystal, causing problems with picture quality of the liquid crystal display device and thus a yield of the liquid crystal display device is degraded.

SUMMARY OF THE INVENTION

Accordingly, the present invention is directed to a liquid crystal display panel having seal pattern for minimizing liquid crystal contamination and method of manufacturing the same that substantially obviates one or more of the problems due to limitations and disadvantages of the related art. Therefore, one advantage of the present invention is to provide a liquid crystal display panel having seal pattern for minimizing liquid crystal contamination and method of manufacturing the same that minimizes an overlap portion of a seal pattern encompassing in a closed form an outer edge of an image display part.

To achieve these and other advantages and in accordance with the purpose of the present invention, as embodied and broadly described herein, there is provided a liquid crystal display panel including a first and a second substrates having at least one image display part; a main pattern on one of the first and second substrates and encompassing the outer edge of the image display part; a start pattern connected to the main pattern and formed from a point spaced apart from the image display part to a point adjacent to an outer edge of the image display part; an end pattern connected to the main pattern and formed from the point adjacent to the outer edge of the image display part to a point spaced apart from the image display part, wherein the start pattern and end pattern extend in a direction substantially parallel to a facing side of the main pattern; and liquid crystal dispensed in the image display part.

In another aspect of the present invention, a method of manufacturing a liquid crystal display panel includes providing a first and second substrates; providing a seal pattern with a sealant surrounding an image display part on one of the first and second substrates, wherein the seal pattern has a main pattern encompassing the outer edge of the image display part, a start pattern connected to the main pattern and an end pattern connected to the main pattern, wherein the start pattern and end pattern extend in a direction substantially parallel to a facing side of the main pattern; dispensing liquid crystal on one of the first and second substrates; attaching the first and second substrates; and cutting the attached first and second substrates along a cut line.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the embodiments of the present invention, examples of which are illustrated in the accompanying drawings.

Figure 5:
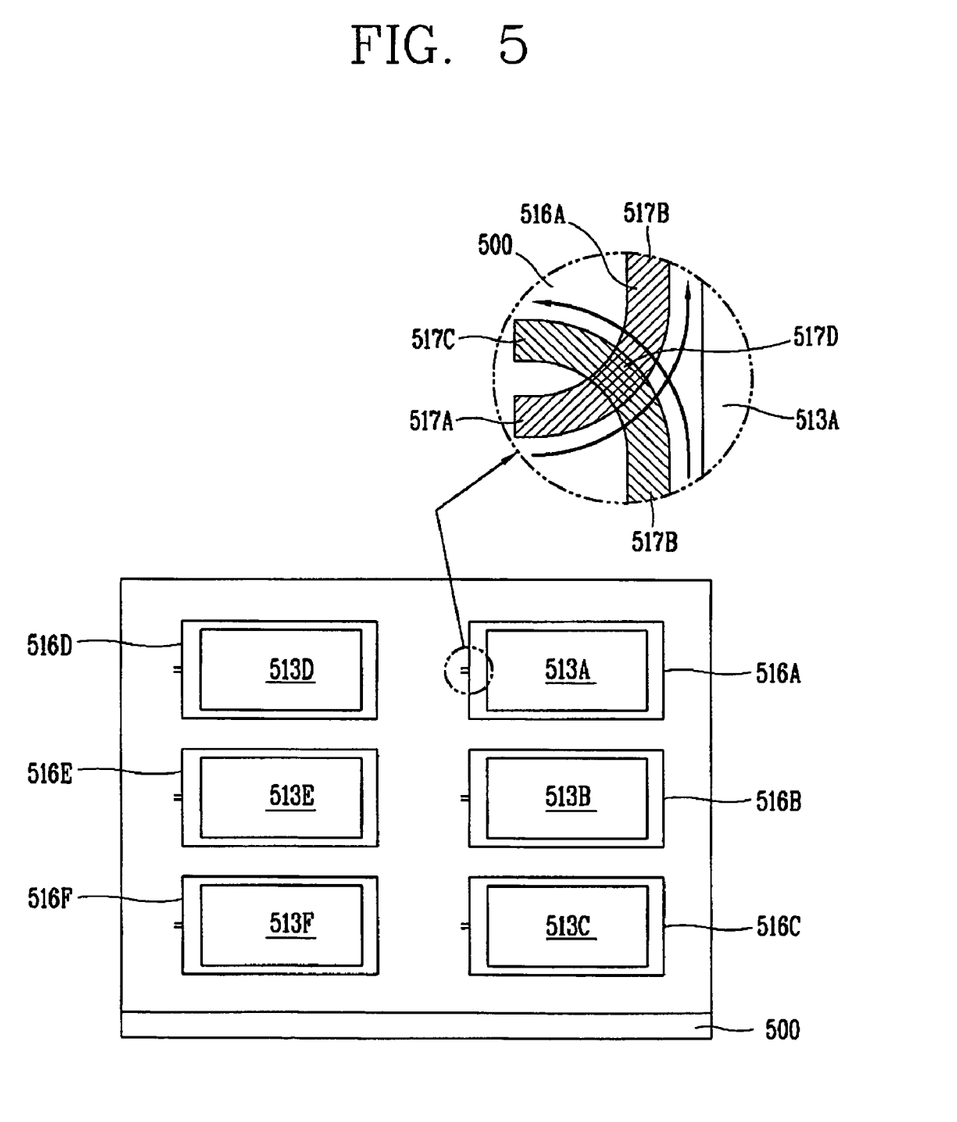
FIG. 5 is an exemplary view showing a liquid crystal display panel in accordance with a first exemplary embodiment of the present invention.

FIG. 5 is an exemplary view showing a liquid crystal display panel in accordance with a first exemplary embodiment of the present invention.

With reference to FIG. 5, a plurality of image display parts 513A-513F and a plurality of seal patterns 516A-516F encompassing each outer edge of the plurality of image display parts 513A-513F are formed on a substrate 500. The substrate 500 may be a first large-scale mother substrate formed of glass on which a plurality of thin film transistor array substrates are formed, or a second large-scale mother substrate made of glass on which a plurality of color filter substrates are formed.

Liquid crystal is dropped or dispensed on the first mother substrate or on the second mother substrate. In this case, liquid crystal may be dropped on the first mother substrate or on the second mother substrate on which the plurality of seal patterns 516A-516F have been formed, or may be dropped on the first mother substrate or on the second mother substrate on which the plurality of seal patterns 516A-516F have not been formed.

After liquid crystal is dropped or dispensed on the first or second mother substrate, the first mother substrate and the second mother substrate are attached using the plurality of seal patterns 516A-516F, then cut and processed to separate a plurality of unit liquid crystal display panels.

Meanwhile, if the plurality of seal patterns 516A-516F are formed with thermosetting sealant, when the first mother substrate and the second mother substrate are vacuum-attached and then thermally hardened, sealant may flow out to contaminate dropped liquid crystal. Thus, the plurality of seal patterns 516A~516F are preferably formed with a UV-hardening sealant or a mixture of the UV-hardening sealant and the thermosetting sealant.

As shown in an enlarged portion of FIG. 5, each of the plurality of seal patterns 516A-516F includes a start pattern 517A formed from a point spaced apart from a image display part 513A which is formed on a substrate 500 to a point adjacent to an outer edge of the image display part 513A, a main pattern 517B connected to the start pattern 517A and encompassing the outer edge of the image display part 513A, and an end pattern 517C connected to the main pattern 517B and formed from the point adjacent to the outer edge of the image display part 513A to a point spaced apart from the image display part 513A. A connection part of the start pattern 517A and the main pattern 517B and a connection part of the main pattern 517B and the end pattern 517C cross each other at a overlap portion 517D.

In order to minimize the overlap portion 517D, the start pattern 517A and the main pattern 517B and the main pattern 517B and the end pattern 517C may be connected in a round form.

The start pattern 517A and the end pattern 517C may be formed to be gradually distanced from or to gradually come closer to the overlap portion 517D between the connection part of the start pattern 517A and the main pattern 517B and the connection part of the main pattern 517B and the end pattern 517C.

The start pattern 517A and the end pattern 517C may be branched from the overlap portion 517D between the connection part of the start pattern 517A and the main pattern 517B and the connection part of the main pattern 517B and the end pattern 517C, and the start pattern 517A and the end pattern 517C may become more distance each other.

The start pattern 517A and the end pattern 517C may be formed anywhere in a dummy region of the substrate 500 where there is no image display part 513A.

Dummy seal patterns (not shown) may be additionally formed at each outer edge region of the plurality of seal patterns 516A-516F in order to protect the plurality of seal patterns 516A-516F.

As mentioned above, in the liquid crystal display panel accordance with an first exemplary embodiment of the first present invention, since the connection part of the start pattern 517A and the main pattern 517B and the connection part of the main pattern 517B and the end pattern 517C cross each other and the start pattern 517A and the end pattern 517C may become more distance each other, the overlap portion 517D where the connection part of the start pattern 517A and the main pattern 517B and a connection part of the main pattern 517B and the end pattern 517C overlap may be minimized.

Here, in order to prevent a disconnection caused as the sealant lumps at a start portion of the start pattern at which dropping of sealant starts and in order to maintain power balance with the image display part with the main pattern formed thereon in scribing, the start pattern and the end pattern may extend in a direction substantially parallel to the main pattern while maintaining a uniform interval from the main pattern, and this will be described in detail through the second exemplary embodiment of the present invention.

Figure 6:
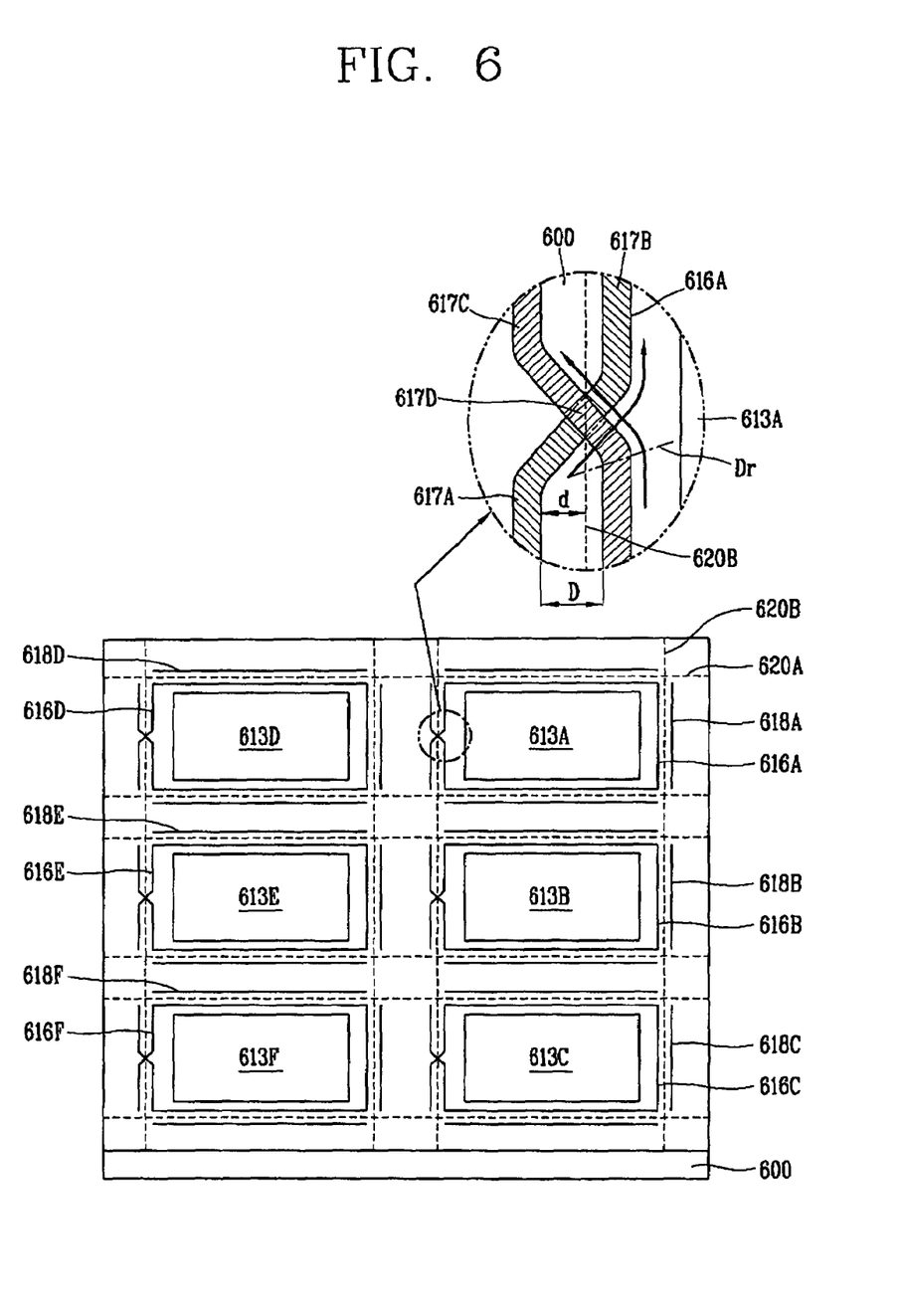
FIG. 6 is an exemplary view showing a liquid crystal display panel in accordance with a second exemplary embodiment of the present invention.

FIG. 6 is an exemplary view showing a liquid crystal display panel in accordance with a second exemplary embodiment of the present invention.

With reference to FIG. 6, a plurality of image display parts 613A-613F and a plurality of seal patterns 616A-616F encompassing each outer edge of the plurality of image display parts 613A-613F are formed on a substrate 600. The substrate 600 may be a first large-scale mother substrate formed of glass on which a plurality of thin film transistor array substrates are formed, or a second large-scale mother substrate made of glass on which a plurality of color filter substrates are formed.

Liquid crystal is dropped or dispensed on the first mother substrate or on the second mother substrate. In this case, liquid crystal may be dropped on the first mother substrate or on the second mother substrate on which the plurality of seal patterns 616A-616F have been formed, or may be dropped on the first mother substrate or on the second mother substrate on which the plurality of seal patterns 616A-616F have not been formed.

After liquid crystal is dropped or dispensed on the first or second mother substrate, the first mother substrate and the second mother substrate are attached using the plurality of seal patterns 616A-616F, then cut and processed to separate a plurality of unit liquid crystal display panels. Here, reference numerals 620A and 620B denote first and second cut lines, respectively, and the first and second mother substrates being attached are separated into a plurality of unit liquid crystal display panels along the first and second cut lines 620A and 620B.

Here, the sealant of which the first and second seal patterns 616A-616F are formed is cured after the first mother substrate attach to the second mother substrate.

Meanwhile, as shown in an enlarged portion of FIG. 6, each of the plurality of seal patterns 616A-616F includes a start pattern 617A formed from a point spaced apart from a image display part 613A which is formed on a substrate 600 to a point adjacent to an outer edge of the image display part 613A, a main pattern 617B connected to the start pattern 617A and encompassing the outer edge of the image display part 613A, and an end pattern 617C connected to the main pattern 617B and formed from the point adjacent to the outer edge of the image display part 613A to a point spaced apart from the image display part 613A. A connection part of the start pattern 617A and the main pattern 617B and a connection part of the main pattern 617B and the end pattern 617C cross each other at an overlap portion 617D.

In this case, in the second exemplary embodiment of the present invention, the start pattern 617A and the end pattern 617C extend in a direction substantially parallel to the main pattern 617B while maintaining an interval (D) of about 1 mm~5 mm from the main pattern 617B.

In this case, the interval (D) is a certain distance (<5 mm) to prevent a disconnection caused as the sealant lumps at the start pattern at which dropping of sealant starts, and in this case, the interval (D) is larger than 1 mm, a minimum distance allowing the first cut line 620A and the second cut line 620B to pass therethrough. The distance (d) between the overlap region 617D and the start pattern 617A or the end patter 617C has a value greater than a half (½) of the interval (D) between the main pattern 617B and the start pattern 617A or the end pattern 617C. The distance (d) is to reduce the size of the unit liquid crystal display panel except for the image display part.

In addition, the region where the main pattern 617B and the start pattern 617A or the end pattern 617C meet form a certain curvature Dr, and in this case, the certain curvature Dr may be 0.5 mm or greater to minimize the area of the overlap region 617D to facilitate cutting.

The start pattern 617A and the end pattern 617C may extend as long as the length of the facing side of the main pattern 617B. In particular, when the attached first and second mother substrates are cut into a plurality of unit liquid crystal display panels, power balance between the image display part 613A where the main pattern 617B are formed and the dummy region where the start pattern 617A and the end pattern 617C are formed may be uniformly maintained, so the cutting may be precisely made along the first and second cut lines 620A and 620B.

In addition, at an outer side of the remaining sides of the main pattern 617B where the start pattern 617A and the end pattern 617C are not formed, there may be formed a dummy pattern 618A in a direction substantially parallel to the respective facing sides, and in this case, the dummy pattern 618A may be formed with the length as long as the respective facing sides.

When the dummy pattern 618A is formed at the outer side of the main pattern 617B, the power balance may be uniformly maintained in the cutting operation and also a cell gap may be uniformly maintained. In this case, the first and second cut lines 620A and 620B are formed between the main pattern 617B and the dummy pattern 618A. And, the first and second cut lines are formed between the start pattern 617A and the main pattern 617B and between the end pattern 617C and the main pattern 617B, passing the overlap portion 617D at one side of the main pattern 617B.

In order to minimize the overlap portion 617D, the start pattern 617A and the main pattern 617B and the main pattern 617B and the end pattern 617C may be connected in a round form. Here, the size of the overlap portion 617D is such that the sealant at the overlap portion 617D dose not come into contact with the liquid crystal before the sealant is cured.

The start pattern 617A and the end pattern 617C may be branched from the overlap portion 617D between the connection part of the start pattern 617A and the main pattern 617B and the connection part of the main pattern 617B and the end pattern 617C, and the start pattern 617A and the end pattern 617C may become more distance each other.

The start pattern 617A, the end pattern 617C and dummy seal pattern 618A may be formed anywhere in a dummy region of the substrate 600 where there is no image display part 613A.

In general, various sheets of liquid crystal display panels, e.g., four, six, eight or sixteen sheets of liquid crystal display panels, are formed on the mother substrates, and the technique for forming the multiple liquid crystal display panels on the mother substrates is an important factor in determining a fabrication efficiency of the liquid crystal display panels. Thus, research for effectively using the mother substrates is actively ongoing and, in particular, these days, the demand for large liquid crystal display panels is increasing, so such technique is the key to determine competitiveness of manufacturers.

The mother substrates are fabricated according to pre-set specifications (standards), and the standards vary depending on the size of liquid crystal display panels. In other words, the standards of mother substrates are set to have a size with which the liquid crystal display panel can be fabricated most effectively. Thus, if liquid crystal display panels are formed with a different size on mother substrates of pre-set standards, there remain many portions where the liquid crystal display panels can not be formed. This problem can be simply solved if the liquid crystal display panels are formed on corresponding mother substrates having standards corresponding to the liquid crystal display panels. But in some cases, it happens that there are no standardized mother substrates with respect to liquid crystal display panels desired to be fabricated, so the liquid crystal display panels have no choice but to be formed on mother substrates with different standards. In this case, undoubtedly, many portions of the mother substrates are bound to be discarded after the liquid crystal display panels are divided, causing a problem that the fabrication cost of the liquid crystal display panels increases.

Thus, the present invention provides a liquid crystal display panel and its fabrication method capable of enhancing the usage efficiency of a mother substrate by disposing liquid crystal display panels with diverse sizes on the single mother substrate.

Figure 7:
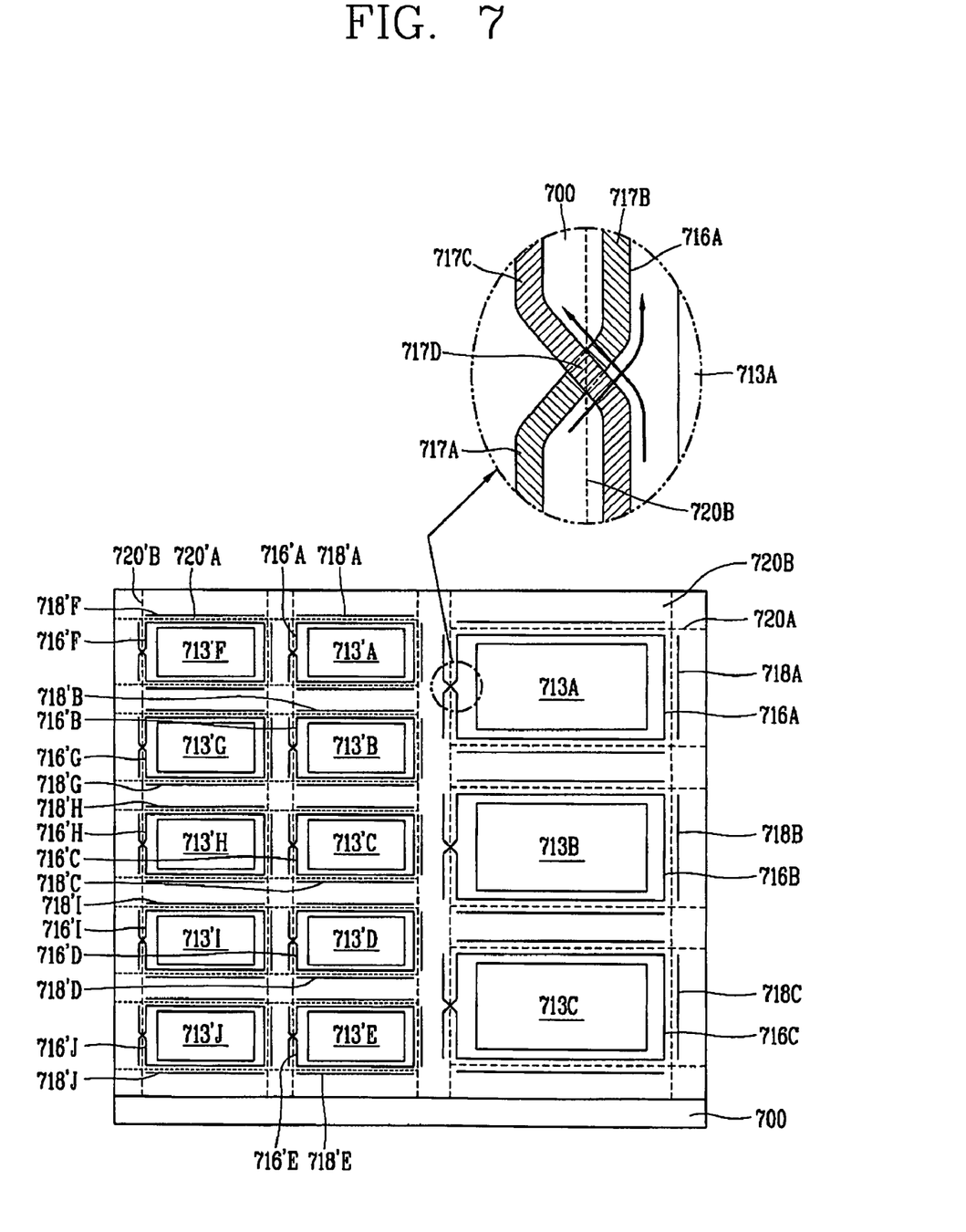
FIG. 7 is an exemplary view showing a liquid crystal display panel in accordance with a third exemplary embodiment of the present invention.

FIG. 7 is an exemplary view showing a liquid crystal display panel in accordance with a third exemplary embodiment of the present invention.

With reference to FIG. 7, a plurality of first image display parts 713A-713C and a plurality of first seal patterns 716A-716C encompassing each outer edge of the plurality of first image display parts 716A-716C are formed on a first region of a substrate 700. And a plurality of second image display parts 713'A-713'J having different size from the first image display parts 716A-716C and a plurality of second seal patterns 716'A-716'J encompassing each outer edge of the plurality of second image display parts 716'A-716'J are formed on a second region of the substrate 700.

The substrate 700 may be a first large-scale mother substrate formed of glass on which a plurality of thin film transistor array substrates are formed, or a second large-scale mother substrate made of glass on which a plurality of color filter substrates are formed.

Liquid crystal is dropped or dispensed on the first mother substrate or on the second mother substrate. In this case, liquid crystal may be dropped on the first mother substrate or on the second mother substrate on which the plurality of first and second seal patterns 716A-716C and 716'A~716'J have been formed, or may be dropped on the first mother substrate or on the second mother substrate on which the plurality of first and second seal patterns 716A-716C and 716'A~716'J have not been formed.

After liquid crystal is dropped or dispensed on the first or second mother substrate, the first mother substrate and the second mother substrate are attached using the plurality of first and second seal patterns 716A-716C and 716'A~716'J, then cut and processed to separate a plurality of first and second unit liquid crystal display panels. Reference numerals 720A, 720'A and 720B, 720'B denote first and second cut lines, and the attached first and second mother substrates are divided into multiple first and second unit liquid crystal display panels along the first cut lines 720A and 720'A and the second cut lines 720B and 720'B, respectively.

Here, the sealant of which the first and second seal patterns 716A-716C and 716'A~716'J are formed is cured after the first mother substrate attach to the second mother substrate.

Meanwhile, as shown in an enlarged portion of FIG. 7, each of the plurality of first and second seal patterns 716A-716C and 716'A~716'J includes a start pattern 717A formed from a point spaced apart from a image display part 713A which is formed on a substrate 700 to a point adjacent to an outer edge of the image display part 713A, a main pattern 717B connected to the start pattern 717A and encompassing the outer edge of the image display part 713A, and an end pattern 717C connected to the main pattern 717B and formed from the point adjacent to the outer edge of the image display part 713A to a point spaced apart from the image display part 713A. A connection part of the start pattern 717A and the main pattern 717B and a connection part of the main pattern 717B and the end pattern 717C cross each other at an overlap portion 717D.

In this case, in the third exemplary embodiment of the present invention, the start pattern 717A and the end pattern 717C extend in a direction substantially parallel to the main pattern 717B while maintaining an interval from the main pattern 717B. The start pattern 717A and the end pattern 717C may extend as long as the length of the facing side of the main pattern 717B. In particular, when the attached first and second mother substrates are cut into a plurality of unit liquid crystal display panels, power balance between the image display part 713A where the main pattern 717B are formed and the dummy region where the start pattern 717A and the end pattern 717C are formed may be uniformly maintained, so the cutting may be precisely made along the first and second pre-arranged first and second cut lines 720A and 720B.

In addition, at an outer side of the remaining sides of the main pattern 717B where the start pattern 717A and the end pattern 717C are not formed, there may be formed a dummy pattern 718A in a direction substantially parallel to the respective facing sides, and in this case, the dummy pattern 718A may be formed with the length as long as the respective facing sides.

When the dummy pattern 718A is formed at the outer side of the main pattern 717B, the power balance may be uniformly maintained in the cutting operation and also a cell gap may be uniformly maintained. In this case, the first and second cut lines 720A and 720B are formed between the main pattern 717B and the dummy pattern 718A. And, the first and second cut lines 720A and 720B are formed between the start pattern 717A and the main pattern 717B and between the end pattern 717C and the main pattern 717B, passing the overlap portion 717D at one side of the main pattern 717B.

In order to minimize the overlap portion 717D, the start pattern 717A and the main pattern 717B and the main pattern 717B and the end pattern 717C may be connected in a round form. Here, the size of the overlap portion 717D is such that the sealant at the overlap portion 717D dose not come into contact with the liquid crystal before the sealant is cured.

The start pattern 717A and the end pattern 717C may be branched from the overlap portion 717D between the connection part of the start pattern 717A and the main pattern 717B and the connection part of the main pattern 717B and the end pattern 717C, and the start pattern 717A and the end pattern 717C may become more distance each other.

The start pattern 717A, the end pattern 717C and dummy seal pattern 718A may be formed anywhere in a dummy region of the substrate 700 where there is no image display part 713A.

If the mother substrates are small or if a plurality of small liquid crystal panels are disposed in the mother substrates, in order to dispose a plurality of the liquid crystal panels in the mother substrates of the same size to its maximum level, the above-described dummy pattern is removed and the seal pattern extends to be common to the neighbor liquid crystal display panel. This will be described in detail through a fourth embodiment of the present invention.

Figure 8:
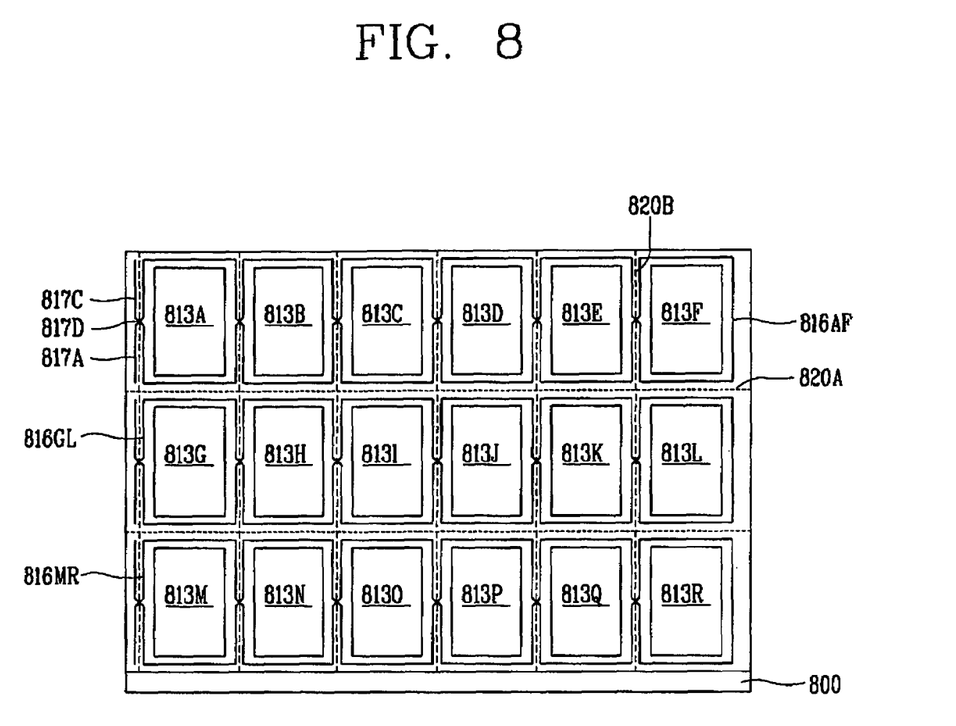
FIG. 8 is an exemplary view showing a liquid crystal display panel in accordance with a fourth embodiment of the present invention.

FIG. 8 is an exemplary view showing a liquid crystal display panel in accordance with a fourth embodiment of the present invention.

With reference to FIG. 8, a plurality of image display parts 813A-813R and a plurality of seal patterns 816AF, 816GL and 816MR encompassing outer edges of the plurality of image display parts 813A-813F, 813G-813L and 813M-813R, respectively, are formed on a substrate 800. The substrate 800 may be a first mother substrate formed of glass on which a plurality of thin film transistor array substrates are formed, or a second mother substrate made of glass on which a plurality of color filter substrates are formed.

Liquid crystal is dropped or dispensed on the first mother substrate or on the second mother substrate. In this case, liquid crystal may be dropped on the first mother substrate or on the second mother substrate on which the plurality of seal patterns 816AF, 816GL and 816MR have been formed, or may be dropped on the first mother substrate or on the second mother substrate on which the plurality of seal patterns 816AF, 816GL and 816MR have not been formed.

After liquid crystal is dropped or dispensed on the first or second mother substrate, the first mother substrate and the second mother substrate are attached using the plurality of seal patterns 816AF, 816GL and 816MR, then cut and processed to separate a plurality of unit liquid crystal display panels. For reference, reference numerals 820A and 820B indicate first and second cut lines, and the attached first and second substrates are separated into a plurality of unit liquid crystal panels along the first and second cut lines.

In this case, the plurality of seal patterns 916AF, 816GL and 816MR form a single pattern connected such that they surround the outer edges of the plurality of image display regions 813A~813F, 813G~813L and 813M~813R based on a single column or row. Namely, for example, the start pattern 817A as those shown in the first to third embodiments of the present invention is formed starting from the first image display region 813A, and the seal pattern 816AF is formed to surround one edges of the first image display region 813A clockwise or counterclockwise. It becomes a start pattern with respect to a neighbor image display region 813B and surrounds one edge of the neighbor image display region 813B clockwise or counterclockwise. This process is repeatedly performed up to the final image display region 813F to surround the entire outer edges of the final image display region 813F, and then, the seal pattern 816AF is formed to surround the other edges of the image display regions 813A~813F, which have not been surrounded yet in the opposite direction. And then, finally, an end pattern 817C is formed to extend in the opposite direction of the start pattern 813A of the first image display region 813A.

Here, reference numeral 817D denotes an overlap region where the connection portion of the main pattern surrounding the image display regions and the start pattern 817A and a connection portion of the main pattern and the end pattern 817C cross.

In this case, the start pattern 817A and the end pattern 817C according to the fourth embodiment of the present invention extend in a direction substantially parallel to one side of the image display regions 813A~813R.

The extending start pattern 817A and the end pattern 817C may extend by the length of the side facing the main pattern.

In addition, in the fourth embodiment of the present invention, a dummy pattern is not formed at an outer portion of the outer side of the other remaining sides of the main pattern where the start pattern 817A and the end pattern 817C are not formed. The reason for this is to improve the usage efficiency of the mother substrates by forming a plurality of liquid crystal display panels at the mother substrates of a small size or by forming a plurality of small liquid crystal display panels at the mother substrates.

In this case, the second cut lines 820B is formed between the overlap portion 817D where the connection portion of the main pattern surrounding the image display regions and the start pattern 817A and the connection portion of the main pattern and the end pattern 817C cross.

In order to minimize the overlap portion 817D, the start pattern 817A and the main pattern and the main pattern and the end pattern 817C may be connected in a round form.

The start pattern 817A and the end pattern 817C may be branched from the overlap portion 817D between the connection part of the start pattern 817A and the main pattern and the connection part of the main pattern and the end pattern 817C, and the start pattern 817A and the end pattern 817C may become more distance each other.

The start pattern 817A and the end pattern 817C may be formed anywhere in a dummy region of the substrate 800 where there is no image display parts 813A-813R.

As so far described, the liquid crystal display panel in accordance with the present invention has the following advantages.

That is, since the overlap portion of the seal pattern that encompasses in a closed form the outer edge of the image display part is minimized, excessive distribution of sealant at the overlap portion can be prevented.

Accordingly, excessive distribution of sealant at the portion where the seal pattern overlaps resulting in spreading into the image display part because of an attaching pressure causing contamination of the liquid crystal may be prevented. Thus, deterioration of a picture quality of the liquid crystal display device may be prevented, and thus, a yield of the liquid crystal display device may be enhanced.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   a first and a second substrates having at least one image display part;
   a main pattern on one of the first and second substrates and encompassing the outer edge of the image display part;
   a start pattern connected to the main pattern and formed from a point spaced apart from the image display part to a point adjacent to an outer edge of the image display part;
   an end pattern connected to the main pattern and formed from the point adjacent to the outer edge of the image display part to a point spaced apart from the image display part, wherein the start pattern and end pattern extend in a direction substantially parallel to a facing side of the main pattern;
   a connection part between the start pattern and the main pattern and a connection part between the main pattern and the end pattern,
   wherein the connection part between the start pattern and the main pattern and the connection part between the main pattern and the end pattern cross each other at an overlap portion; and
   liquid crystal dispensed in the image display part.

2. The liquid crystal display panel of claim 1, wherein a size of the overlap portion is such that sealant of the overlap portion dose not come into contact with the liquid crystal before the sealant is cured.

3. The liquid crystal display panel of claim 1, wherein the start pattern and the end pattern extend as long as the length of the facing side of the main pattern.

4. The liquid crystal display panel of claim 1, wherein the start pattern and the end pattern extend in a direction substantially parallel to the main pattern while maintaining an interval (D) of about 1 mm~5 mm from the main pattern.

5. The liquid crystal display panel of claim 4, wherein a distance (d) between the overlap portion and the start pattern or the overlap portion and the end pattern is larger than the half of the interval (D).

6. The liquid crystal display panel of claim 1, further comprising a dummy seal pattern at an outer side of the remaining sides of the main pattern where the start pattern and end pattern are not formed.

7. The liquid crystal display panel of claim 6, wherein the dummy seal pattern extends as long as the length of the facing side of the main pattern.

8. The liquid crystal display panel of claim 1, wherein the substrate is one of a first large-scale mother substrate having a plurality of thin film transistor array substrates and a second large-scale mother substrate having a plurality of color filter substrates.

9. The liquid crystal display panel of claim 1, wherein the image display part includes a first image display part and a second image display part having different size from the first image display part.

10. The liquid crystal display panel of claim 1, wherein the start pattern and the main pattern are connected in a round form and the main pattern and the end pattern are connected in a round form.

11. The liquid crystal display panel of claim 1, wherein the start pattern and the end pattern are formed to be substantially symmetric with each other.

12. The liquid crystal display panel of claim 1, wherein a distance between the start pattern and the end pattern gradually increases with the distance from the overlap portion.

13. The liquid crystal display panel of claim 1, wherein the start pattern and the end pattern are branched from the overlap portion.

14. The liquid crystal display panel of claim 1, wherein a curvature (Dr) of the connection part between the main pattern and the start pattern or the main pattern and the end pattern is larger than about 0.5 mm.

15. The liquid crystal display panel of claim 1, wherein the plurality of patterns form a single pattern connected such that the patterns surround the outer edges of the plurality of image display regions based on a single column or row.

16. A method of fabricating a liquid crystal display panel, comprising:
   providing a first and second substrates;
   providing a seal pattern with a sealant surrounding an image display part on one of the first and second substrates, wherein the seal pattern has a main pattern encompassing the outer edge of the image display part, a start pattern connected to the main pattern and an end pattern connected to the main pattern, wherein the start pattern and end pattern extend in a direction substantially parallel to a facing side of the main pattern,
   wherein a connection part between the start pattern and the main pattern and a connection part between the main pattern and the end pattern cross each other at an overlap portion;
   dispensing liquid crystal on one of the first and second substrates;
   attaching the first and second substrates; and
   cutting the attached first and second substrates along a cut line.

17. The method of claim 16, wherein the start pattern and the end pattern extend as long as the length of the facing side of the main pattern.

18. The method of claim 16, wherein the start pattern and the end pattern extend in a direction substantially parallel to the main pattern while maintaining an interval (D) of about 1 mm~5 mm from the main pattern.

19. The method of claim 18, wherein a distance (d) between the overlap portion and the start pattern or the overlap portion and the end pattern is larger than the half of the interval (D).

20. The method of claim 16, further comprising providing a dummy seal pattern at an outer side of the remaining sides of the main pattern where the start pattern and end pattern are not formed.

21. The method of claim 20, wherein the dummy seal pattern extends as long as the length of the facing side of the main pattern.

22. The method of claim 16, wherein the image display part includes a first image display part and a second image display part having different size from the first image display part.

23. The method of claim 16, further comprising curing the sealant after the first substrate attach to the second substrate.

24. The method of claim 16, wherein the cut line is formed between the start pattern and the main pattern and between the end pattern and the main pattern, passing the overlap portion at one side of the main pattern.

25. The method of claim 16, wherein a curvature (Dr) of the connection part between the main pattern and the start pattern or the main pattern and the end pattern is larger than about 0.5 mm.

26. The method of claim 16, wherein the plurality of patterns form a single pattern connected such that the patterns surround the outer edges of the plurality of image display regions based on a single column or row.

* * * * *